March 15, 1949.  E. M. KENNEDY  2,464,515
CONFECTION PRODUCT
Filed Oct. 18, 1946

INVENTOR.
E. M. KENNEDY
BY
Attorneys

Patented Mar. 15, 1949

2,464,515

UNITED STATES PATENT OFFICE 2,464,515

CONFECTION PRODUCT

Earl M. Kennedy, Cleveland, Ohio

Application October 18, 1946, Serial No. 704,595

3 Claims. (Cl. 99—137)

My invention pertains to the art of confection manufacture and involves a product which is novel in the form of a stick or handle equipped confection as known in the art, as well as novel apparatus for the production of a number of such confections at one time.

It has heretofore been proposed in this art to produce ice cream or frozen confections mounted upon sticks or handle members, and one of the objects of my invention is to devise a confection of the above class wherein the confection bodies of different flavors may be carried by a suitable rigid handle or stick member with the confection bodies so separated that they will be readily eatable independently of one another. With the foregoing object in view I have devised a novel form of carrying member for the confection bodies comprising a combined handle formed with separate confection supporting parts or members on which the confection bodies of ice cream or other frozen material may be attached by congelation or otherwise, and from which confection body supporting parts the confection bodies may be readily separately eaten.

It is within the contemplation of my invention that the carrying member above referred to may be used in conjunction with candy bodies attached thereto tho the design of my invention is primarily for the purpose of utilizing the carrying members in connection with the frozen type confection heretofore referred to.

Another feature of my product of this invention is the provision of the carrying member with centering means for supporting it properly upon the apparatus in which the frozen bodies to be attached to the carrying member by congelation are frozen.

As indicated above my invention further comprises a novel apparatus in which the carrying members in multiple numbers may be mounted and properly centered, which apparatus is adapted to contain in separate chambers thereof the confection of material which is to be frozen, and by its freezing action congealed upon the confection supporting parts or members of the carrying member.

A more full understanding of my invention and the advantages thereof will be obtained upon reference to the specific description, in conjunction of the annexed drawings, in which.

Figure 3:
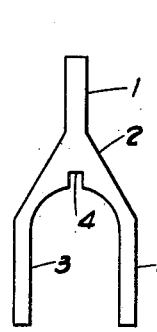
Figure 3 is a view in elevation of one of the carrying members alone.
Figure 5:
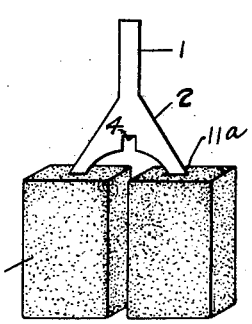
Figure 5 is a view in elevation showing one of the carrying members with its separate confection bodies congealed or supported thereon.
Figure 4:
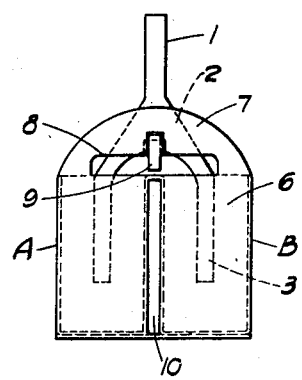
Figure 4 is an end elevation of the apparatus with the carrying members in position therein.
Figure 6:
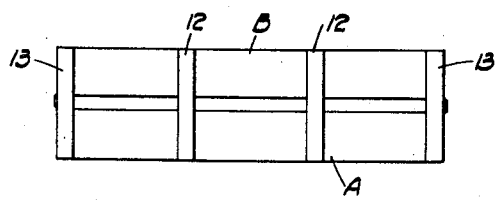
Figure 6 is a reduced and somewhat diagrammatic bottom plan view of the apparatus alone.

Specifically describing the product and apparatus features of my invention I refer first to Figure 3 to show the carrying members previously referred to, the same comprising a flat unit structure including the stick or handle member 1 the body portion 2 and the confection supporting members or tines 3 that really comprise bifurcate extensions of the body 2 in a direction opposite to the handle member 1 and are about equal in length to the combined length of said body and handle. In the lower edge of the body portion 2 and longitudinally centered in a direction parallel with the members 3 the body portion 2 is formed with a centering notch 4 the purpose of which will be hereinafter described. To provide the tines 3 the body 2 has portions extending laterally from the handle 1 in a divergent manner, the tines 3 thence extending parallel to each other spaced a considerable distance from the line or longitudinal axis of the hande in paralleism with the latter.

Figure 1:
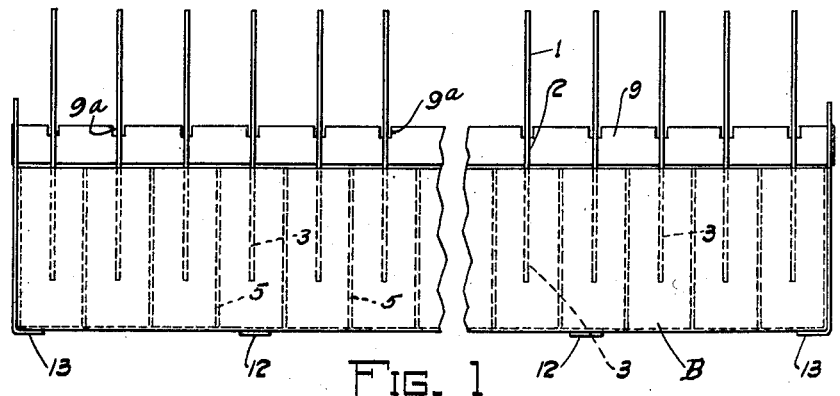
Figure 1 is a side elevation of apparatus of my invention with carrying members mounted thereon, the various compartments or chambers for the frozen confection material to be congealed onto the carrying members being shown ready to receive the confection material in liquid form, later to be introduced into the freezing chamber for freezing operation.
Figure 2:
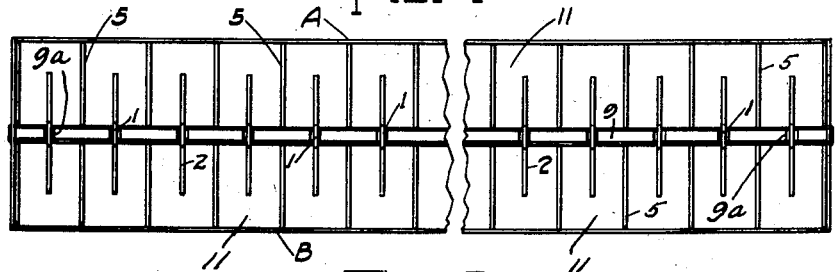
Figure 2 is a top plan of the apparatus, the carrying members mounted in position as shown also in Figure 1 and the condition of the apparatus being the same as illustrated in Figure 1.

Upon reference to Figures 1 and 2, the apparatus forming a part of my invention will be seen to comprise spaced sections as generally designated at A and B and each consisting of a generally rectangular body divided into chambers or compartments by means of partitions 5 extending transversely thereof; the partitions 5 are substantially of the same vertical dimension or depth as the side walls of each of the compartment sections A and B.

The sections A and B include in addition to the partition walls and the side walls, end walls 6 which extend above the side walls to provide the handle extensions 7 for being grasped by anyone who is handling the apparatus, to facilitate such operation. If desired the extensions 7 may be cut out as shown at 8 in order to form clearance spaces to receive the fingers of the person who grasps the extension 7 in carrying the apparatus from one place to another and depositing the same.

Supported by means of the extension members 7 on the ends 6 of the sections A and B of the apparatus described is a longitudinal centering bar designated 9, the same extending centrally and longitudinally of the space 10 provided longitudinally between the two sections A and B. The centering bar 9 is disposed in a plane slightly above the horizontal plane of the upper edges of the various chambers 11 of the sections A and B, as provided by the partitions 5, and has positioning notches 9a for the proper spacing of the members 1—2—3 and also to center the latter relative to the chambers 11.

Now with the foregoing construction in mind it will be apparent that my apparatus comprises two spaced longitudinal sections A and B each of which is virtually a longitudinal container or receptacle and each of which is divided into the separate chambers 11 by means of the several partitions 5. The number of chambers in the sections A and B may be modified as determined by the size of the apparatus desired to be handled, and the number of sections confection bodies 11a that are to be formed in the chambers 11 and attached to the various confection carrying members 1—2—3.

Now in the use of my apparatus under practical conditions of manufacture of frozen or similar confections thereby I emplace in position above each pair of transverse aligned chambers or compartments 11 of the two sections A and B a single one of the carrying members comprising the parts 1—2—3 previously described. Each carrying member is arranged to straddle the centering bar or member 9 and is held in a normally centralized position above the two chambers 11 over which it is disposed by engaging the notch 4 of the carrying member over the bar 9 in a manner which will be quite evident upon reference to Figures 1 and 2 of the drawings. It will be presumed that before placing the carrying members in position as stated, the chambers 11 have been filled with ice cream in fluid or semi-fluid form, or the confection body may be made of any suitable material adapted to be frozen or congealed. Thus the tines 3 extending from the handle portion 1 of the carrying members will be embedded in the preliminarily fluid material of the frozen confection and the carrying members will all be generally vertically disposed and preferably centered transversely in the apparatus with the tines 3 correspondingly centered in the chambers in which they are downwardly extending.

Thereupon the apparatus may be lifted bodily with its liquid or semi-solid contents of freezable material and placed in a suitable freezing chamber where the confection bodies are frozen independently in the several compartments 11 of the sections A and B of my invention. In this operation the apparatus may be handled by grasping the parts 7 extending from the ends 6 in the manner previously suggested.

After the freezing operation is performed, my apparatus with its contents now comprising two confection bodies frozen to each of the sticks or handle members 1, will be removed from the freezing chamber. Then by dipping the apparatus in hot water or subjecting it to a blast of hot air, the surfaces of the confection bodies being slightly melted, will permit each confection unit comprising the member 1 having two confection bodies congealed to its pair of tines 3, to be readily removed from the apparatus. The apparatus will preferably be made of sheet metal largely and the centering bar 9 may be made of wood or metal, but as illustrated in the drawings will be made of metal, the end portions of which are swaged at the outer surface of the end members 6 or rather the extensions 7 of said members, thus to prevent displacement of the centering bar 9 from its supporting members 7.

Since the sections A and B as to their container portions and the respective chambers 11 thereof are independent, it is obvious that the material to be frozen to form the confection bodies on the tines 3 of each carrying member, may be of one flavor in one section such as A and of a different flavor in the other section such as B. Moreover the frozen bodies attached by congelation or otherwise to the tines 3 are frozen or secured in such spaced relation that by grasping the handle 1 each of the bodies may be readily eaten off of its tine 3 separately from the eating of the other body attached to the other tine 3.

I preferably make the carrying members 1—2—3 each of a single flat piece of wood, but of course another suitable material may be employed. It is made of wood or course from a single length of a wood blank or stick; hundreds of the members 1—2—3 may be simultaneously produced from this for quantity production purposes.

The bottom portions of the sections A and B container members of my apparatus are transversely connected together intermediate the ends 6 by means of the transverse cleats or straps marked 12. At the ends of the apparatus the end members 6 are formed with inwardly extending horizontal flanges at their lower edges to underlie and additionally connect sections A and B of my apparatus together, the flanges being designated at 13.

The confections carrying members 1—2—3 are adapted to support the frozen confection bodies for dipping in coatings of chocolate, nuts, or granular materials, according to practice known to those versed in the art of this invention.

Having thus described my invention, what I claim as new and desire to secure by Letters Patent of the United States is:

1. As a new article of manufacture, a member for supporting confection bodies to be eaten therefrom, comprising a body having an elongated handle member at one end, said body having laterally extending portions at its other end formed with long tines spaced outwardly from the longitudinal axis of the handle and extending parallel with each other and with the handle to receive and support spaced confection bodies, said handle, body, and tines being formed from a single flat piece of material with all of said portions lying in the same plane.

2. As a new article of manufacture, a carrying member as claimed in claim 1, in which the body portion of the supporting member intermediate the tines is formed with a central centering notch alined with the handle and separate from the space between the tines.

3. As a new article of manufacture, a supporting member comprising a flat body provided at one end with an elongated flat handle member, and provided at the other end with spaced flat tines extending longitudinally from and disposed in the same plane as the handle member and spaced outwardly from the longitudinal axis of the handle, said tines being disposed parallel to each other and of a length substantially equal to that of the handle and body, and an individual confection body on each carrying member, said confection bodies being spaced apart for separate edibility.

EARL M. KENNEDY.

REFERENCES CITED

The following references are of record in the file of this patent:

UNITED STATES PATENTS

| Number | Name | Date |
|---|---|---|
| 1,867,945 | Hunter | July 19, 1932 |
| 1,881,817 | Meyer | Oct. 11, 1932 |
| D. 92,987 | Thomas | Aug. 7, 1934 |
| 2,043,252 | Kronbach | June 9, 1936 |
| D. 102,639 | Olin | Jan. 5, 1937 |
| 2,175,324 | Stamp | Oct. 10, 1939 |
| D. 117,455 | Parr | Nov. 7, 1939 |
| 2,246,778 | Cahoon | June 24, 1941 |
| D. 137,301 | Willems | Feb. 15, 1944 |